No. 845,794. PATENTED MAR. 5, 1907.
S. V. KENNEDY & C. S. SHARP.
MOWING MACHINE.
APPLICATION FILED OCT. 8, 1904.
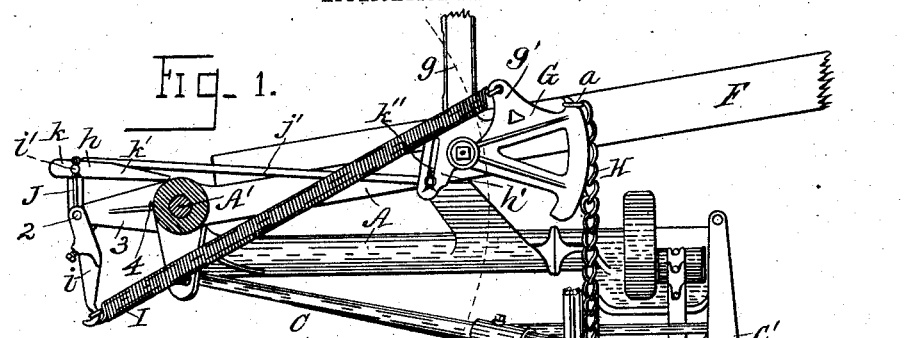
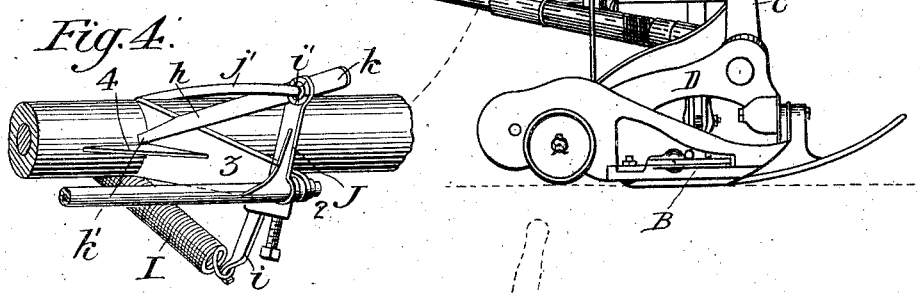
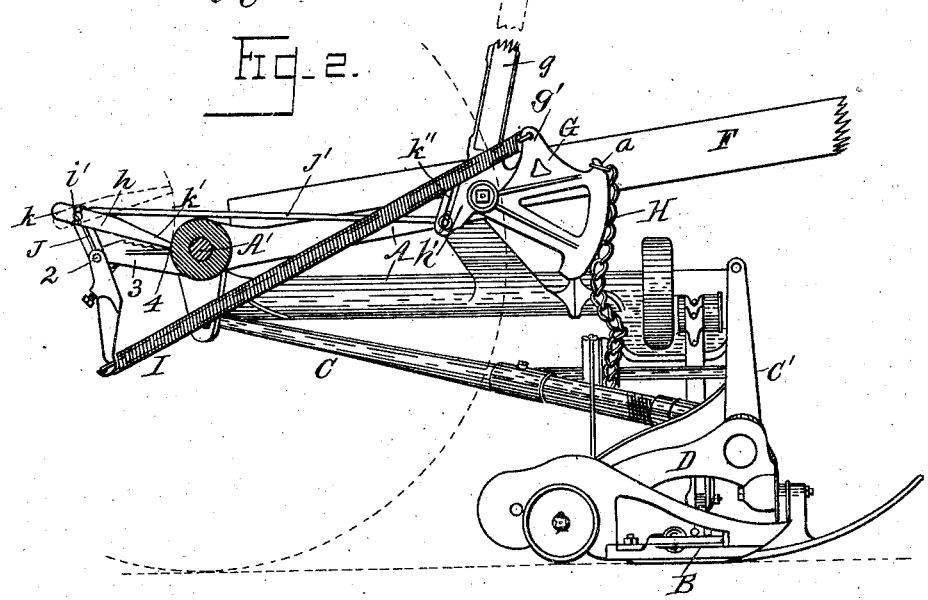
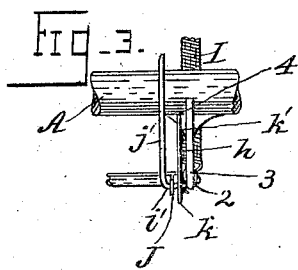
Witnesses:
Richard J. Kidney
F. R. Bowers
Inventors:
Samuel V. Kennedy
Charles S. Sharp
by W. C. Johnston
their Attorney

UNITED STATES PATENT OFFICE.

SAMUEL V. KENNEDY AND CHARLES S. SHARP, OF AUBURN, NEW YORK, ASSIGNORS, BY MESNE ASSIGNMENTS, TO INTERNATIONAL HARVESTER COMPANY, A CORPORATION OF NEW JERSEY.

MOWING-MACHINE.

No. 845,794.   Specification of Letters Patent.   Patented March 5, 1907.

Application filed October 8, 1904. Serial No. 227,699.

*To all whom it may concern:*

Be it known that we, SAMUEL V. KENNEDY and CHARLES S. SHARP, citizens of the United States of America, residing at Auburn, in the county of Cayuga and State of New York, have invented certain new and useful Improvements in Mowing-Machines, of which the following is a specification.

Our invention relates to that class of harvesters known as "mowing-machines," and has for its object to relieve the pole or shafts, and consequently the necks of the horses, from the weight of the cutting apparatus, particularly when detaching the team from the machine.

In the accompanying drawings, Figure 1 represents in side elevation our device in its normal position, as much of the mowing-machine being shown as is necessary to illustrate our invention. Fig. 2 is a similar view to Fig. 1, showing our device in operation, a part of the frame being broken away for that purpose. Fig. 3 is a detail plan. Fig. 4 is a perspective view of a fragment of the machine, showing the constructions and relations of the detent and dog hereinafter referred to.

A is the main frame; A', the axle. The cutting apparatus consists of the diagonal push-bar C, the coupling-bar C', and the yoke D, to which they are attached, both the push-bar and coupling-bar being connected with the yoke and the frame of the machine in the usual manner. B is the cutter-bar, and F is the pole, rigidly secured to the frame A.

A pivoted quadrant-lever G, operated by a hand-lever $g$, is pivoted upon the main frame. It has an arm $g'$ in front of and extending above its pivot and a depending arm $h'$ projecting below and behind its pivot. A lifting-chain H is connected to the quadrant at $a$ and to the push and coupling bars for the double purpose of raising the cutting apparatus from the ground, as well as to permit of a part of its weight being carried by the main shaft through the intermediacy of the spring I, which will be more fully described presently. A lifting-spring I is hooked to the quadrant-lever G and to an adjustable down-hanging arm $i$, projecting downward from a bracket 3 on the rear of the main frame. An upstanding arm J is pivoted at 2 on the bracket 3. A link $j'$ is hooked in the upper end of the arm J, the end $i'$ of the link forming a bearing for a gravity-dog $h$, having an extension $k$ rearward of its pivot, so that pressure of the foot or hand upon the extension $k$ will cause the front end $k'$ to rise, as shown in dotted lines in Fig. 2. The forward end of the link $j'$ engages with a slot $k''$ in the rear of the quadrant-lever G, the slot being so arranged that during the operation of raising the cutting apparatus it will not cause a rearward movement of the dog $h$, the end of which when in its normal position of disuse, as shown in Fig. 1. rests upon the top of the axle-bearing portion of the frame A.

To illustrate the operation of our device, it will be assumed that the hand-lever being in the position it normally occupies when the machine is in operation (such position being indicated in Fig. 1) it is desired to relieve the pole or shafts of the weight of the cutting apparatus, the hand-lever $g$ is pushed forward, moving the link $j'$ rearwardly and rocking the arm J until the forward end of the gravity-dog $h$ drops down upon a ledge 4 integral with and on the rear of the axle-bearing portion of the main frame, where it is firmly held when the hand-lever is released by the tension of the spring I upon the quadrant-lever G, which, it will be understood, is constantly pulling rearward on the upper arm of the quadrant G and pushing its rearward arm having the slot $k''$ forward, so that the link $j'$ pulls on the upstanding arm J. The dog $h$ thus coöperates with the stop, preventing the counterbalance-spring I from effecting any movement of the quadrant G, because the rear arm of the quadrant is held from moving forward by the link $j'$. This holds the chain $h$ slack, as shown in Fig. 2, and the pole is relieved of the entire weight of the cutting apparatus, which rests upon the ground. The pole F can then be easily raised to disengage it from the team.

To restore the various parts to their normal positions, as shown in Fig. 1, a forward movement of the hand-lever $g$ will rock the arm J to permit the point of the gravity-dog $h$ to be raised off of the ledge 4 onto the top of the axle-bearing portion of the main frame. The point of the dog $h$ is raised by the hand or foot of the driver acting upon the rear portion of the dog to tilt it. Then upon removing the pressure from the lever $g$ the tension of the spring I will return the parts to their normal position, as shown in Fig. 1.

It will now appear that when the hand-lever is moved forward the tension of the spring $i$ upon the cutting apparatus is relieved, and when the lever is held forward (by hand or the usual locking means) the entire weight of the cutting apparatus rests upon the ground. Similarly the cutting apparatus may be raised off the ground by moving the hand-lever sufficiently to the rear, and when the lever is held in this position (by hand or the usual locking means) the weight of the cutting apparatus is thrown upon the tongue. During the operation of the machine the hand-lever oscillates between its two positions just described, so that the chain $h$ is held taut, and the counterbalance-spring relieves the pressure of the cutting apparatus upon the ground by transferring a portion of its weight to the tongue.

Having thus described our invention, what we claim, and desire to cover by Letters Patent of the United States, is—

1. In a mower, the combination of the frame, the cutting apparatus, a lifting-lever pivoted on the frame and free to oscillate in the operation of the machine, a chain connecting the lever with the cutting apparatus, a counterbalance-spring reacting between the lever and the frame, a stop on the frame in rear of the lever, a dog to engage the stop, and a connection between the dog and the lever, whereby when the lever is moved forward of its normal position the dog engages the stop and holds the lever forward with the chain slack and the spring inoperative, the connection permitting the lever to move rearward of said normal position without operating the dog.

2. In a mower, the combination of the frame, the cutting apparatus, a quadrant chain-connected to the cutting apparatus, a lifting-lever secured to the quadrant, a counterbalance-spring reacting between the quadrant and the frame, an arm pivoted on the frame in rear of the lever, a pivoted dog carried by the arm, a link connecting the arm with the quadrant so that the arm is moved rearward when the lever is moved forward, and a stop on the frame to be engaged by the dog when the lever is moved forward of its normal position, whereby the lever is held in such forward position with the chain slack and the spring inoperative.

3. In a mower, the combination of the frame, the cutting apparatus, a quadrant pivoted on the frame and free to oscillate in the operation of the machine, a lifting-lever secured to the quadrant, a chain connecting the quadrant with the cutting apparatus, a counterbalance-spring reacting between the quadrant and the frame, an arm pivoted on the frame in rear of the lever, a stop on the frame in front of the arm, a dog on the arm to engage the stop, and a connection between the quadrant and the arm which moves the arm rearward when the lever is moved forward of its normal position, but which permits the lever to move rearward of its normal position without operating the dog.

4. In a mower, the combination of the frame, the cutting apparatus, a quadrant chain-connected to the cutting apparatus and having an arm $g'$ projecting above its pivot, and an arm $h'$ depending below its pivot, a lifting-lever secured to the quadrant, a counterbalance-spring reacting between the quadrant and the frame, an arm pivoted on the frame in rear of the axle, a dog carried by the arm, a link connecting the pivoted arm with the depending arm of the quadrant, a slot in said depending arm in which the front end of the link plays, and a stop on the frame to be engaged by the dog when the pivoted arm is moved rearward, whereby when the lever is moved forward of its normal position the pivoted arm moves rearward and the dog engages the stop, but when the lever is moved rearward of its normal position the link-and-slot connection between the dog-carrying arm and the quadrant permits the latter to move without operating the dog.

5. In a mower, the combination of the frame the cutting apparatus, the pivoted lever G chain-connected to the cutting apparatus, and having an arm $h'$ depending below its pivot, said arm having a slot $k''$, a bracket 3 projecting from the frame in rear of the axle, an arm J pivoted to the bracket, a gravitating dog $h$ carried by the arm J, and a link $j'$ connecting the arm with the slot in the depending arm of the lever G.

6. In a mower, the combination of the frame, the cutting apparatus, the lever G chain-connected to the cutting apparatus, and having the arm $h'$ depending below its pivot, a bracket 3 projecting from the frame in rear of the axle, a ledge 4 on the frame in rear of the axle, an arm J pivoted to the bracket, a gravitating dog $h$ carried by the arm and having a rearward extension $k$, and a link $j'$ connecting the pivoted arm J with the slot $k''$ in the depending arm of the quadrant G.

In testimony whereof we hereunto set our hands, this 21st day of September, 1904, in the presence of two attesting witnesses.

SAMUEL V. KENNEDY.
CHARLES S. SHARP.

Witnesses:
RAYMOND E. SEARLS,
H. SEYMOUR BETTS.